United States Patent [19]

Bäni et al.

[11] Patent Number: 4,744,491
[45] Date of Patent: May 17, 1988

[54] DEVICE FOR THE DISTRIBUTION OF CARTRIDGES IN A CARTRIDGE CARRIER FOR A COFFEE MACHINE

[75] Inventors: Heinz Bäni, Granges; Roger Jaquier, Chexbres, both of Switzerland

[73] Assignee: Nestec S.A., Vevey, Switzerland

[21] Appl. No.: 864,828

[22] Filed: May 19, 1986

[30] Foreign Application Priority Data

Jun. 28, 1985 [CH] Switzerland .......................... 2768/85

[51] Int. Cl.⁴ .............................................. B65G 59/06
[52] U.S. Cl. ..................................... 221/172; 221/301
[58] Field of Search ................ 221/22, 172, 290, 291, 221/295, 301

[56] References Cited

U.S. PATENT DOCUMENTS

| | | | |
|---|---|---|---|
| 118,250 | 8/1871 | Knowlton | 221/172 |
| 1,008,429 | 11/1911 | Osmer | 221/301 |
| 2,279,093 | 4/1942 | Peters | 221/301 X |
| 2,558,633 | 6/1951 | Tuttle | 221/290 X |
| 2,813,615 | 11/1957 | Klein | 221/290 X |
| 4,136,202 | 1/1979 | Favre | 426/77 |
| 4,235,351 | 11/1980 | Kolbl et al. | 221/301 X |

FOREIGN PATENT DOCUMENTS 0605293 12/1976 Switzerland .

Primary Examiner—F. J. Bartuska
Attorney, Agent, or Firm—Vogt & O'Donnell

[57] ABSTRACT

A device for the distribution of cartridges containing ingredients for the preparation of a beverage has a housing, a cavity, a distribution tube and a delivery tube. The device also has a pivoting spring lever, and a retaining system which has a triangular shape attached to the lever on either side of the pivot.

6 Claims, 4 Drawing Sheets

DEVICE FOR THE DISTRIBUTION OF CARTRIDGES IN A CARTRIDGE CARRIER FOR A COFFEE MACHINE

This invention relates to a device for the distribution of cartridges intended for the preparation of a beverage in a cartridge holder for a coffee machine.

Cartridges for the preparation of beverages, particularly coffee, are already known and are now becoming increasingly more attractive, especially in cafes and restaurants, because they are directly ready for use and thus eliminate the need for any manipulation on the part of the user. These cartridges, for example of the type described in Swiss Pat. No. 605 293, and which are in the general shape of an acute truncated cone are designed to be placed in a recess provided for this purpose in the cartridge holder of the coffee machine. The cartridge holder is then placed in the coffee machine itself for preparing the desired beverage. The device according to the present invention enables the cartridges to be directly delivered one by one from their pack into the cartridge holder of the coffee machine without any need for manipulation on the part of the user. This avoids any risk of damage to the cartridges and incorrect positioning in the cartridge holder.

The present invention relates to a device for the distribution of cartridges intended for the preparation of a beverage in a cartridge holder for a coffee machine, preferably of the espresso type, comprising a substantially vertical delivery tube for said cartridges and a spring lever with a horizontal axis arranged substantially behind or below the delivery tube and comprising a double retaining system extending into a means for cooperating with the cartridge holder.

The device according to the invention is as it were complementary with a coffee machine so that it is preferably integrated with or situated beside the coffee machine. It would also be possible to provide one device for each type of coffee regularly consumed. The cartridge holder is loaded as follows: the square or rectangular end of the open pack, which is a carton or any other equivalent pack, is introduced into the delivery tube. The cartridges are arranged side-by-side or top to bottom in the pack. The first cartridges drop into the delivery tube and are stopped by the retaining system. The cartridge holder is then engaged in the lower part of the device, pushing the lever pack or down and releasing the first cartridge which drops, turns through approximately 90° and arrives correctly positioned in the cartridge holder. In the context of this specification, correctly positioned is understood, for example where a cartridge according to Swiss Pat. No. 605 293 is used, to mean that the cartridge in position in the cartridge holder should have its cover facing downwards because it is through this cover that the beverage has to flow. The correct position of the cartridge will become more clearly apparent by reference to the drawings. When the cartridge holder is withdrawn, the following cartridge in the delivery tube positions itself against the retaining system and the device is ready for another distribution sequence.

In a first embodiment, the device according to the invention comprises a distribution tube, as an extension of the vertical delivery tube, which is widened in relation to the vertical delivery tube and which opens into a cavity designed to receive the cartridge holder, the spring lever extending to said cavity and a fixed yoke arranged horizontally in the distribution tube.

Each retaining system of the lever is disposed on either side of the pivot axis of the lever. The function of the first retaining system is to stop and then release the cartridge which is to drop into the cartridge holder while the function of the second retaining system is to prevent the second cartridge from dropping while the first is being loaded into the cartridge holder.

The lever comprises two arms in the zone of the distribution tube. The yoke is arranged at that level between the two arms. The function of the yoke is to cause the cartridge to turn through approximately 90° during its descent so that it is correctly positioned before its arrival in the cartridge holder. In addition, the yoke advantageously comprises a flexible tongue to limit the extent to which the cartridge turns during its descent.

Now, with regard to the dimensions of the device according to the invention, the delivery and distribution tubes have a depth substantially equal to the diameter of the cartridges, the delivery tube has a width substantially equal to the height of the cartridges and the distribution tube has a maximum width substantially equal to twice the height of the cartridges.

In a second embodiment, the device according to the invention comprises a distribution tube as an extension of the vertical delivery tube and inclined in relation to the horizontal, the spring lever extending to the exit of the distribution tube. The distribution tube normally forms an angle of from 5° to 30° with the horizontal. The spring lever comprises two substantially perpendicular lever arms, each arm comprising a retaining system, one in the delivery tube and the other in the distribution tube.

So far as the dimensions are concerned, the delivery tube has a depth substantially equal to the diameter of the cartridges, the delivery and distribution tubes have a width substantially equal to the height of the cartridges and the distribution tube has a length substantially equal to three times the diameter of the cartridges.

One particularly advantageous embodiment is characterized by the provision of an automatic system for feeding the pack into the delivery tube, for example by means of a known trigger system. Several open packs containing the cartridges are thus disposed behind the delivery tube and parallel to the pivot axis of the spring lever. The trigger system then brings the first pack over the delivery tube. Cartridges are removed until this first pack is empty, after which the first pack is withdrawn and the trigger system brings the second pack over the delivery tube. Cartridges then continue to be removed until all the packs are empty and, finally, the corresponding magazine is replenished with the appropriate number of packs. This ensures that the device according to the invention is well capable of independent operation. Even if the device does not comprise an automatic feed system, it is provided in that case with storage compartments for cartridge packs behind the delivery tube.

The invention is described in more detail in the following with reference to the accompanying drawings.

Figure 1:
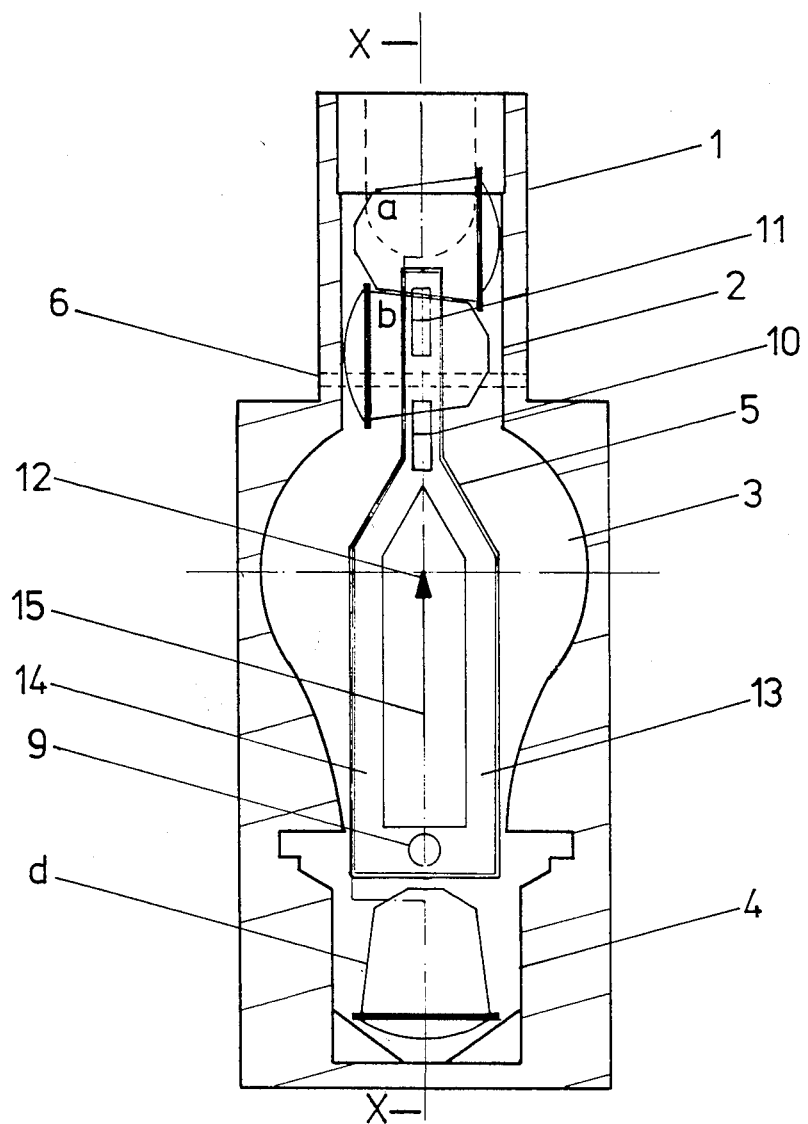
FIG. 1 is a front view of the device according to the invention in a first embodiment.

The device (1) comprises a delivery tube (2), a distribution tube (3) and a cavity (4) designed to receive a cartridge holder of which the outer contour has been shown. The lever (5) integrated into the above-mentioned tubes pivots about its axis (6) and bears through the reaction of the spring (7) against a stop (8). This lever comprises a double retaining system (10,11) in the form of a triangular prism and, at its lower end, an abutment (9) against which the cartridge holder bears. Finally, the lever (5) comprises two arms (13) and (14) between which the fixed yoke (12) is disposed.

Figure 2:
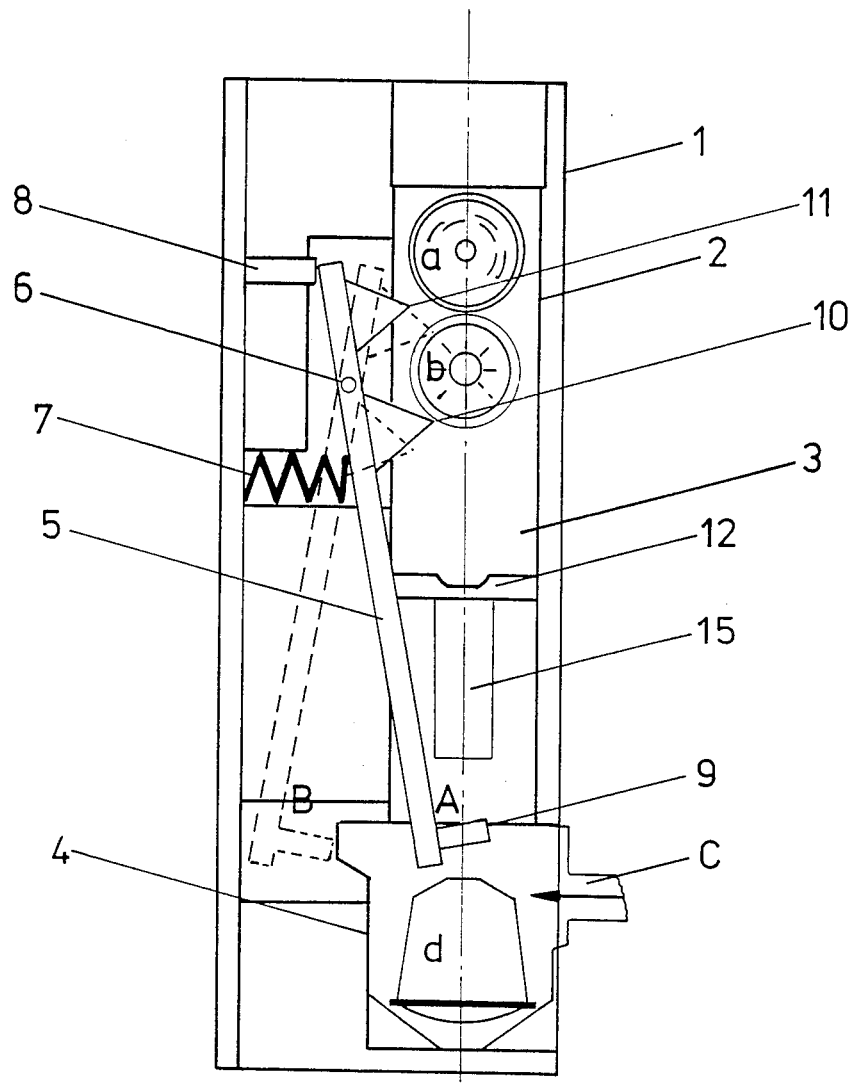
FIG. 2 is a section on the line x—x of FIG. 1.

The system operates as follows: the open end of the carton (not shown) containing the cartridges arranged top to bottom is engaged in the upper end of the delivery tube (2). The first two cartridges (b) and (a) of this carton have been shown. The cartridge (b) bears against the retaining system (10) while the cartridge (a) bears against the cartridge (b). When it is desired to release the cartridge (b), the cartridge holder is introduced into the cavity (4) in the direction of the arrow C. The cartridge holder pushes the lever (5) via the abutment (9) from position A to position B (FIG. 2). The spring (7) is thus compressed, the retaining system (10) releases the cartridge (b) which drops onto the yoke (12), turns and is thus correctly positioned for arrival at (d) in the cartridge holder. The yoke advantageously comprises a tongue (15) to limit the extent to which the cartridge turns during its descent. The retaining system (11) blocks the cartridge (a) when the lever is in position B. This ensures that the cartridge holder is individually fed with cartridges. When the cartridge (b) is in position in the cartridge holder, the cartridge holder is withdrawn, causing the lever (5) to move from position B to position A through the reaction of the spring (7). The retaining system (11) thus releases the cartridge (a) which moves a notch and is blocked by the retaining system (10). The device is thus ready for another cartridge distribution sequence. Referring to FIG. 1, the cartridge (b) will pass to the left of the yoke in the distribution tube and the cartridge (a) to the right of the yoke and so on for the following cartridges.

Figure 3:
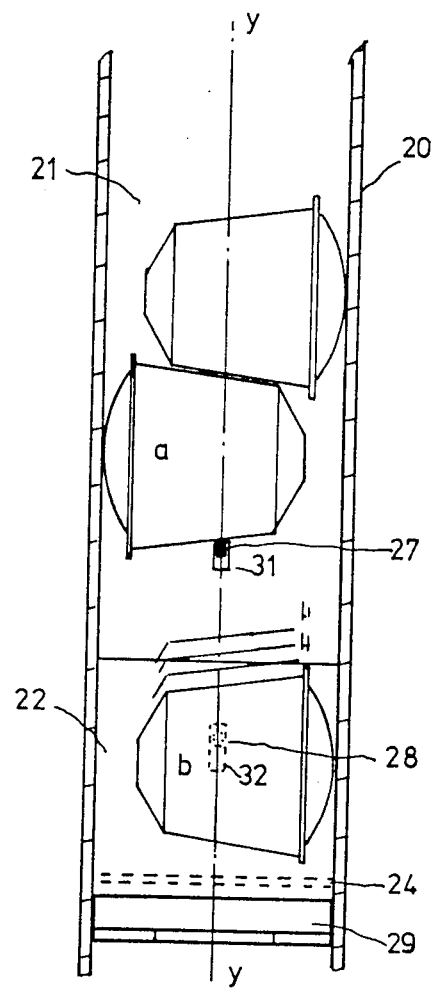
FIG. 3 is a front view of the device according to the invention in a second embodiment.
Figure 4:
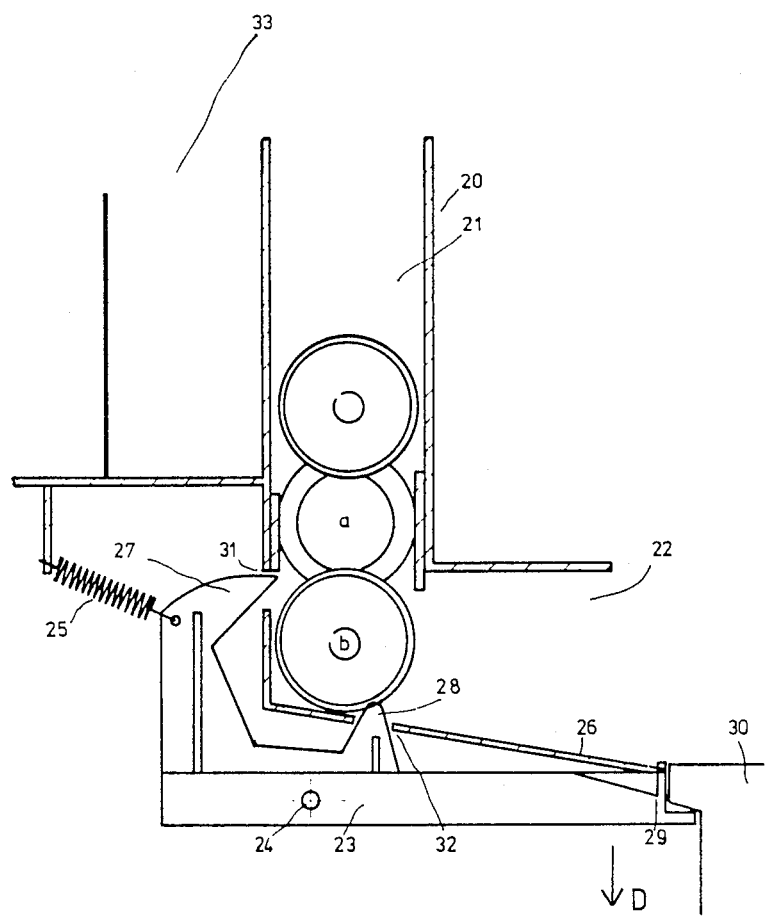
FIG. 4 is a section on the line y—y of FIG. 3.

In the second embodiment shown in FIGS. 3 and 4, the device (20) comprises a delivery tube (21), a distribution tube (22) and a lever (23) pivoting about its axis (24) and bearing by the reaction of the spring (25) against the lower part (26) of the distribution tube. This lever comprises a double retaining system (27,28) of triangular shape and, in its extension, a means (29) which cooperates with the cartridge holder (30). The retaining system (27,28) engages in the delivery and distribution tubes through the respective openings (31,32). Finally, the device comprises storage compartments (33) for cartridge packs. This system operates as follows: the first two cartridges (b) and (a) have been shown. The cartridge (b) bears against the retaining system (28) while the cartridge (a) bears against the cartridge (b). When it is desired to release the cartridge (b), the cartridge holder (30) is introduced and applied at (29) to cause the lever to pivot in the direction of the arrow D. The retaining system (28) releases the cartridge (b) which runs down the slope of the distribution tube (22) and turns through 90° due to the frustoconical shape of the cartridge to arrive correctly positioned in the cartridge holder. The retaining system (27) blocks the cartridge (a) during the descent of the cartridge (b).

When the cartridge (b) is in position in the cartridge holder (30), the cartridge holder is removed, the lever (23) returns, the retaining system (27) moves aside and thus allows the cartridge (a) to move into the position where it bears against the retaining system (28). The device is thus ready for another cartridge distribution sequence.

The device according to the invention provides for the safe and convenient distribution of cartridges in a cartridge holder for coffee machines. As already mentioned, the cartridges according to Swiss Pat. No. 605 293 are preferably distributed. The device according to the invention may also be used for the distribution of other types of cartridges. To this end, it is merely necessary to adapt the dimensions of the delivery and distribution tubes accordingly and also the position and shape of the yoke in the distribution tube or the length of the distribution tube.

We claim:

1. A device for the distribution of cartridges containing ingredients for the preparation of a beverage comprising:

(a) a housing;
    (b) a cavity within the housing;
    (c) a delivery tube within the housing positioned above the cavity;
    (d) a distribution tube between and communicating with the delivery tube and the cavity and being widened in relation to the delivery tube;
    (e) a horizontal yoke positioned within the distribution tube;
    (f) a spring lever within the housing extending from above the distribution tube to the cavity, the lever being pivotally affixed about an axis which is at a position above the distribution tube, the lever being capable of pivoting from a first position to a second position, and the distribution tube having an opening capable of receiving a portion of the lever which is configured to move freely about the yoke within the distribution tube;
    (g) a first retaining means affixed to the lever below the pivot axis at a position coinciding with the position where the delivery tube communicates with the distribution tube, a second retaining means affixed to the lever above the pivot axis, the delivery tube having openings to receive entry of each retaining means, and the first and second retaining means being configured such that they are spaced about a cartridge width apart;

the lever, first and second retaining means, cartridges and yoke being capable of cooperating such that when the lever is moved to the first position, the first retaining means is withdrawn from the tubes thereby releasing a cartridge into the delivery tube and such that a cartridge is retained by resting upon the second retaining means, and such that when the lever is urged to pivot to the second position, the second retaining means is withdrawn from the delivery tube and the first retaining means enters into the delivery tube such that the cartridge which rested upon the second retaining means is released to then rest upon the first retaining means, the horizontal yoke being positioned within the distribution tube such that a cartridge moving through the distribution tube contacts the yoke and is forced to rotate to an orientation suitable for insertion into the cavity.

2. A device as claimed in claim 1, wherein the delivery and distribution tubes have a depth substantially equal to the diameter of the cartridges, the delivery tube has a sustantially equal to the height of the cartridges and the distribution tube a maximum width substantially equal to twice the height of the cartridges.

3. A device as claimed in claim 1, wherein the yoke comprises a flexible tongue.

4. A device as claimed in claim 1, wherein the delivery tube has a depth substantially equal to the diameter of the cartridges, the delivery and distribution tubes have a width substantially equal to the height of the cartridges and the distribution tube a length substantially equal to three times the diameter of the cartridges.

5. A device as claimed in claim 1, wherein the delivery tube further comprises a system for the automatic supply of cartridge packs to the delivery tube.

6. A device as claimed in claim 1, further comprising storage compartments located behind the delivery tube.

* * * * *